US012756540B2

(12) United States Patent
Lin et al.

(10) Patent No.: US 12,756,540 B2
(45) Date of Patent: Oct. 6, 2026

(54) METHOD, APPARATUS, ELECTRONIC DEVICE, AND READABLE STORAGE MEDIUM FOR VERTICAL FEDERATED LEARNING

(71) Applicant: Beijing Volcano Engine Technology Co., Ltd., Beijing (CN)

(72) Inventors: Yu Lin, Beijing (CN); Yang Liu, Beijing (CN); Ye Wu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 19/103,842

(22) PCT Filed: Feb. 29, 2024

(86) PCT No.: PCT/CN2024/079251
§ 371 (c)(1),
(2) Date: Feb. 14, 2025

(87) PCT Pub. No.: WO2024/193311
PCT Pub. Date: Sep. 26, 2024

(65) Prior Publication Data
US 2026/0012329 A1 Jan. 8, 2026

(30) Foreign Application Priority Data
Mar. 21, 2023 (CN) ......................... 202310282556.3

(51) Int. Cl.
*H04L 29/06* (2006.01)
*G06N 5/01* (2023.01)
(Continued)

(52) U.S. Cl.
CPC ............ *H04L 9/0819* (2013.01); *G06N 5/01* (2023.01); *H04L 9/008* (2013.01)

(58) Field of Classification Search
CPC ... H04L 9/0819; H04L 9/008; H04L 41/0631; H04L 41/0636; H04L 2025/03815;
(Continued)

(56) References Cited

U.S. PATENT DOCUMENTS

2021/0073677 A1 3/2021 Peterson et al.
2021/0314140 A1 * 10/2021 Stephenson ............. G06N 3/09
(Continued)

FOREIGN PATENT DOCUMENTS

CN 116822660 A 9/2003
CN 111598186 A 8/2020
(Continued)

OTHER PUBLICATIONS

Jing, Bo (Year: 2021).*
(Continued)

*Primary Examiner* — Edward Zee
*Assistant Examiner* — Leynna Truvan
(74) *Attorney, Agent, or Firm* — BakerHostetler

(57) ABSTRACT

The disclosure relates to a method, apparatus, electronic device and readable storage medium for vertical federated learning. In the method, upon a plurality of participants training a random forest model based on a common sample participating in vertical federated learning, for a node to be trained on a decision tree included in the random forest model, the plurality of participants encrypt an identity configured to indicate whether the training sample is present in the node to be trained by a semi-homomorphic encryption technology, and then send it to the counterparty, and a further participant calculates a required ciphertext calculation result in a ciphertext space; in addition, the ciphertext calculation result is processed using a differential privacy technology and fed back to the counterparty, ensuring the security of the issued ciphertext calculation result, avoiding
(Continued)

reversely interfering from the ciphertext calculation result to obtain related information of the sample, and improving the security of the sample.

20 Claims, 7 Drawing Sheets

(51) Int. Cl.
*H04L 9/00* (2022.01)
*H04L 9/08* (2006.01)

(58) Field of Classification Search
CPC ..... H04L 67/1061; H04L 9/0836; G06N 5/01; H04N 1/00503; H04N 21/4665; G05B 2219/32271; G05B 2219/32272; G05B 2219/32273; G05B 23/0243; G06T 2207/20081; G10L 15/144; G10L 17/06; G05D 1/0088
See application file for complete search history.

(56) References Cited

U.S. PATENT DOCUMENTS

| | | | | |
|---|---|---|---|---|
| 2021/0376995 | A1 | 12/2021 | Ratha et al. | |
| 2023/0208875 | A1 * | 6/2023 | Do | H04L 63/1425 726/22 |

FOREIGN PATENT DOCUMENTS

| | | | | |
|---|---|---|---|---|
| CN | 112597379 A | | 4/2021 | |
| CN | 113408668 A | | 9/2021 | |
| CN | 113722987 A | | 11/2021 | |
| CN | 113947211 A | | 1/2022 | |
| CN | 114169537 A | | 3/2022 | |
| CN | 114448597 A | | 5/2022 | |
| CN | 114492850 A | | 5/2022 | |
| CN | 115082193 A | | 9/2022 | |
| CN | 113379463 B | * | 7/2024 | G06F 21/602 |

OTHER PUBLICATIONS

Xie Shimao et al., "Fastboosting Tree Algorithm Based on Heterogeneous Federated Learning," China Academic Journal Electronic Publishing House, Information Technology and Standardization, No. 6, Feb. 28, 2022, pp. 55-61, with English abstract.
International Search Report from PCT/CN2024/079251, dated May 19, 2024, 5 pages with machine translation.
Chinese Patent Application No. 202310282556.3, First Office Action dated Mar. 21, 2024, 41 pages with machine translation.
Chinese Patent Application No. 202310282556.3, Decision of Grant dated Jun. 13, 2024, 8 pages with machine translation.

* cited by examiner

METHOD, APPARATUS, ELECTRONIC DEVICE, AND READABLE STORAGE MEDIUM FOR VERTICAL FEDERATED LEARNING

This application is the U.S. national stage application of International Patent Application No. PCT/CN2024/079251, filed on Feb. 29, 2024, which claims priority to Chinese Patent Application No. 202310282556.3, filed on Mar. 21, 2023, entitled "METHOD, APPARATUS, ELECTRONIC DEVICE, AND READABLE STORAGE MEDIUM FOR VERTICAL FEDERATED LEARNING", the entirety of which is incorporated herein by reference.

FIELD

The present disclosure relates to the technical field of data processing, in particular to a method, apparatus, electronic device and readable storage medium for vertical federated learning.

BACKGROUND

Federated learning is one of the currently popular machine learning technologies, which can solve the problem of how to jointly train a global model on a virtual "aggregated" data set while protecting data security of each participant when there exists a plurality of participants. Federated learning can be further divided into horizontal federation, vertical federation and federal transfer. In the vertical federation, the sample data in the data set owned by the plurality of participants overlap with each other, but the features are complementary, which can be applied to a scenario in which features from multiple parties service the same business label, and therefore, vertical federated learning is widely used. Random forest is one of the current mainstream machine learning algorithms and is widely used in classification scenarios.

At present, a random forest model is trained through a vertical federated learning technology, information such as feature data of a sample of each participant and intermediate values generated in a training process are usually collected by adopting a trusted third party server, then the third-party server performs iterative updating of the global model, and then the third-party server distribute the determined parameters of the global model to each participant. When the random forest model is trained by adopting the method of vertical federated learning, the sample security is low.

SUMMARY

To solve the technical problem above, the present disclosure provides a method, apparatus, electronic device and readable storage medium for vertical federated learning.

In a first aspect, the present disclosure provides a method for vertical federated learning, including:

- upon training a random forest model based on a common sample participating in vertical federated learning, performing, for a node to be trained on a decision tree included in the random forest model, semi-homomorphic encryption on a first identity indicating whether the sample is present and a category label of the sample to obtain a first ciphertext, and sending the first ciphertext to a further participant to enable the further participant to calculate to obtain, in a ciphertext space and based on the first ciphertext, a ciphertext calculation result matching with a type of the node to be trained;
- receiving a second ciphertext sent by the further participant, and training the node to be trained based on the type of the node to be trained and the second ciphertext to configure a category of the node to be trained or configure a corresponding split feature value, the second ciphertext comprising a result obtained by performing differential privacy processing on the ciphertext calculation result by the further participant;
- updating, for the decision tree, the node to be trained for training, until a decision tree training finish condition is met, to obtain a target decision tree, trainings for all decision tree in the random forest model being completed to obtain a target random forest model.

In a second aspect, the present disclosure provides a method for vertical federated learning, including:

- upon training a random forest model based on a common sample participating in vertical federated learning, receiving, for a node to be trained on a decision tree included in the random forest model, a first ciphertext sent by a further participant, the first ciphertext being obtained by performing semi-homomorphic encryption on a first identity indicating whether the sample is present and a category label of the sample by the further participant; calculating to obtain, in a ciphertext space and based on the first ciphertext, a ciphertext calculation result matching with a type of the node to be trained, and performing differential privacy processing based on the ciphertext calculation result to obtain a second ciphertext, and sending the second ciphertext to the further participant to enable the further participant to perform random forest model training based on the second ciphertext;
- receiving feedback information sent by the further participant, and configuring a category of the node to be trained or configuring a corresponding split feature value based on the feedback information and the second ciphertext;
- updating, for the decision tree, the node to be trained for training, until a decision tree training finish condition is met, to obtain a target decision tree, trainings for all decision tree in the random forest model being completed to obtain a target random forest model.

In a third aspect, the present disclosure provides an apparatus for vertical federated learning, including:

- a training module, configured to upon training a random forest model based on a common sample participating in vertical federated learning, perform, for a node to be trained on a decision tree included in the random forest model, semi-homomorphic encryption on a first identity indicating whether the sample is present and a category label of the sample to obtain a first ciphertext;
- a transceiver module, configured to send the first ciphertext to a further participant to enable the further participant to calculate to obtain, in a ciphertext space and based on the first ciphertext, a ciphertext calculation result matching with a type of the node to be trained;
- the transceiver module being further configured to receive a second ciphertext sent by the further participant;
- the training module being further configured to train the node to be trained based on the type of the node to be trained and the second ciphertext to configure a category of the node to be trained or configure a corresponding split feature value, the second ciphertext comprising a result obtained by performing differential privacy processing on the ciphertext calculation result by the further participant; update, for the decision tree, the node to be trained for training, until a decision tree training finish condition is met, to obtain a target decision tree, trainings for all decision tree in the random forest model being completed to obtain a target random forest model.

In a fourth aspect, the present disclosure provides an apparatus vertical federated learning, including:

a transceiver module, configured to upon training a random forest model based on a common sample participating in vertical federated learning, receive, for a node to be trained on a decision tree included in the random forest model, a first ciphertext sent by a further participant, the first ciphertext being obtained by performing semi-homomorphic encryption on a first identity indicating whether the sample is present and a category label of the sample by the further participant;

a training module, configured to calculate to obtain, in a ciphertext space and based on the first ciphertext, a ciphertext calculation result matching with a type of the node to be trained, and perform differential privacy processing based on the ciphertext calculation result to obtain a second ciphertext;

the transceiver module being further configured to send the second ciphertext to the further participant to enable the further participant to perform random forest model training based on the second ciphertext; and receive feedback information sent by the further participant;

the training module being configured to train the node to be trained based on the feedback information and the second ciphertext to configure a category of the node to be trained or configuring a corresponding split feature value based on the feedback information and the second ciphertext; update, for the decision tree, the node to be trained for training, until a decision tree training finish condition is met, to obtain a target decision tree, trainings for all decision tree in the random forest model being completed to obtain a target random forest model.

In a fifth aspect, the present disclosure provides an electronic device, including: a memory and a processor, the memory being configured to store computer program instructions;

the processor being configured to execute the computer program instructions to enable the electronic device to implement the method for vertical federated learning according to the first aspect or the second aspect.

In a fourth aspect, the present disclosure provides a readable storage medium, including: computer program instructions; the computer program instructions being executed by at least one processor of an electronic device to enable the electronic device to implement the method for vertical federated learning according to.

In a fifth aspect, the present disclosure provides a computer program product which, when executed by an electronic device, enables the electronic device to implement the method for vertical federated learning according to the first aspect or the second aspect.

BRIEF DESCRIPTION OF DRAWINGS

The drawings herein are incorporated in and constitute a part of this specification, illustrating embodiments consistent with the present disclosure and, together with the specification, serve to explain the principles of the present disclosure.

In order to more clearly illustrate the technical solutions in the embodiments of the present disclosure or in the prior art, the accompanying drawings used in the description of the embodiments or the prior art will be briefly introduced below, and it is obvious to those skilled in the art that other drawings may be obtained according to these drawings without creative labor.

DETAILED DESCRIPTION

Figure 1:
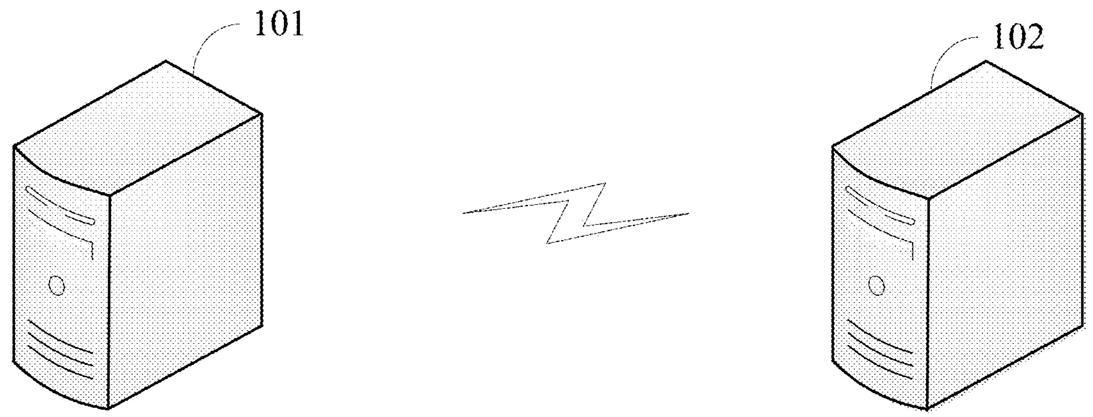
FIG. 1 is a schematic diagram of an application scenario of a method for vertical federated learning provided in the present disclosure.

In order to be able to more clearly understand the above objects, features and advantages of the present disclosure, the solutions of the present disclosure will be further described below. It should be noted that, in the case of no conflict, the embodiments and the features in the embodiments of the present disclosure may be combined with each other.

Many specific details are set forth in the following description to facilitate a thorough understanding of the present disclosure, but the present disclosure may also be implemented in other ways other than those described herein; it is apparent that the embodiments in the specification are only part, not all, of the embodiments of the present disclosure.

First, some terms and the like involved in the present disclosure are described in detail.

1. Random Forest Model

The random forest model is a classifier including a plurality of decision trees. Each decision tree is composed of nodes and directed edges, where the nodes include leaf nodes and internal nodes, and a parameter corresponding to the leaf node is a category, which is used to indicate a classification result of a sample/an object to be classified reaching the node; and a parameter corresponding to the internal node is a split feature value, which is used to differentiate a training sample/an object to be processed reaching the node to a connected left child node or a connected right child node.

2. Semi-Homomorphic Encryption

For any participant, such as participant G, it has a homomorphic key pk, sk, an encryption function E, and a decryption function D. For any data x, y, the following properties are satisfied:

a. homomorphic addition: $E_{pk}(x) \oplus E_{pk}(y)=E_{pk}(x+y)$ and $E_{pk}(x) \oplus y=E_{pk}(x+y)$ b. homomorphic multiplication: $E_{pk}(x) \otimes y=E_{pk}(x*y)$ 3. Differential Privacy For any data x, the differential privacy data satisfying the privacy budget may be obtained given a privacy budget ε and sensitivity s.

A formula may be expressed as: $\tilde{x}=L_{\varepsilon,s}(x)$

The present disclosure provides a method, apparatus, electronic device and readable storage medium for vertical federated learning. In the method, upon a plurality of participants training a random forest model based on a common sample participating in vertical federated learning, for a node to be trained on a decision tree included in the random forest model, the plurality of participants encrypt an identity configured to indicate whether the training sample is present in the node to be trained by a semi-homomorphic encryption technology, and then send it to the counterparty, and a further participant calculates a required ciphertext calculation result in a ciphertext space; in addition, the ciphertext calculation result is processed using a differential privacy technology and fed back to the counterparty, ensuring the security of the issued ciphertext calculation result, avoiding reversely interfering from the ciphertext calculation result to obtain related information of the sample, and improving the security of the sample.

The method for vertical federated learning provided in the present disclosure will be described in detail below with reference to the accompanying drawings and scenarios combined with some embodiments.

FIG. 1 is a schematic diagram of an application scenario of a method for vertical federated learning provided in an embodiment of the present disclosure. Referring to FIG. 1, the scenario includes two participants, namely a first participant 101 and a second participant 102, and the two participants may be: a server, a service cluster, a cloud server, a cloud platform, and the like, and the type of the participant is not limited in the present disclosure.

Figure 2:
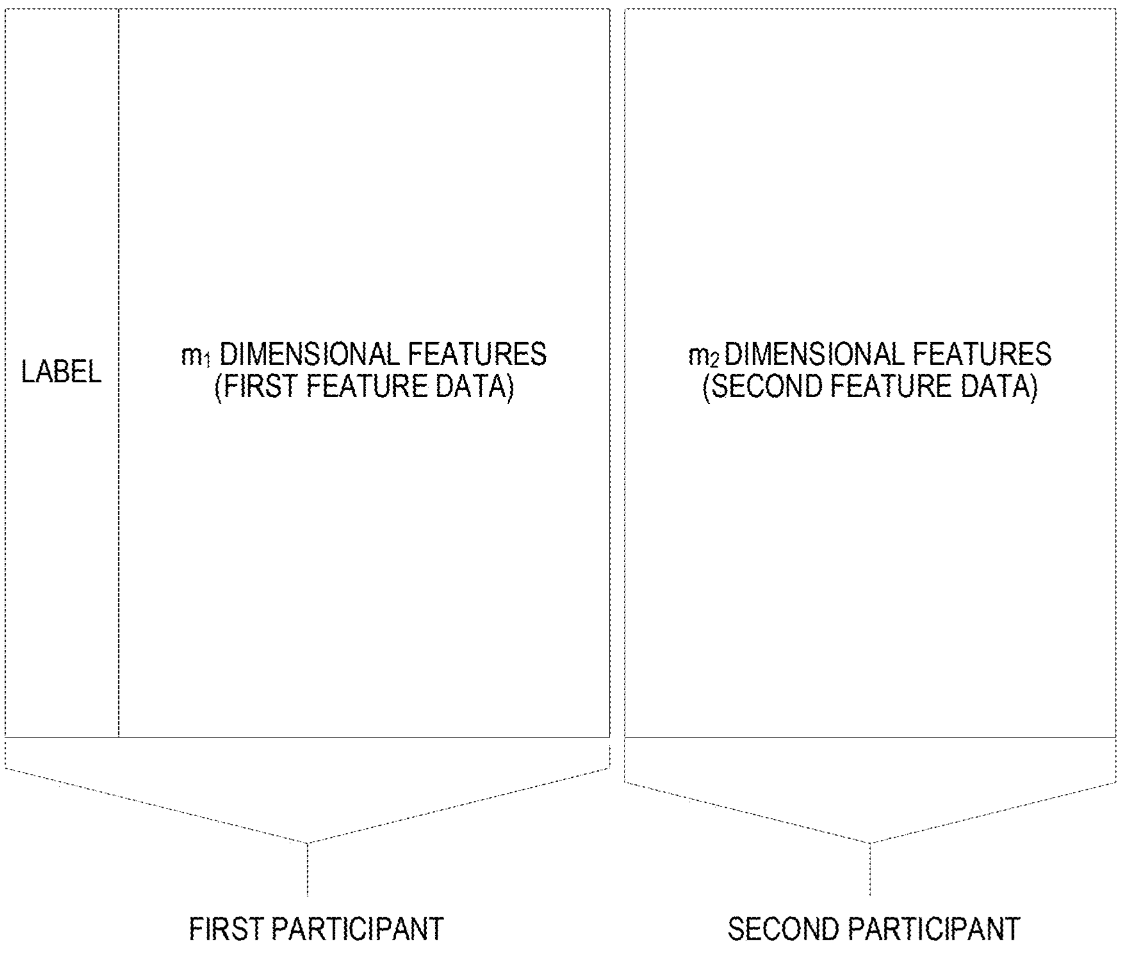
FIG. 2 is a schematic diagram of feature data distribution of a sample provided in an embodiment of the present disclosure.

FIG. 2 is a schematic diagram of data distribution of a sample (also referred to as a training sample) in a first participant 101 and a second participant 102. Referring to FIG. 2, the first participant 101 has an m1-dimensional first feature data and a category label of the sample, and the second participant 102 has an m2-dimensional second feature data of the sample. Wherein, the feature data possessed by the first participant 101 and the second participant 102 are different, but they have the same identity document (ID) for the same training sample. In the present disclosure, the sample is usually structured data, and may be, but is not limited to, an image, a voice, a text, and other types of samples.

Herein, the first participant 101 and the second participant 102 may train the global random forest model based on the common sample through vertical federated learning and perform the classification task by using the trained random forest model.

In the model training stage, for the node to be trained on the decision tree included in the random forest model, when calculating the number of samples existing on the node to be trained or the split gain of each feature value, the first participant 101 and the second participant 102 separately perform semi-homomorphic encryption on the identity used to indicate whether the sample has the current node and send it to the other counterparty, and the other participant processes and obtains the required ciphertext calculation result in the ciphertext space. And before the ciphertext calculation result is issued to the counterparty, the ciphertext calculation result is processed through the differential privacy technology, ensuring the security of the issued ciphertext calculation result.

In the prediction stage, for an object to be classified, the first participant 101 and the second participant 102 respectively output a classification result based on different feature values of the object to be classified by using the trained random forest model respectively, and then encrypt the classification result by using semi-homomorphic encryption technology and send it to the object, to ensure the security of the object to be classified.

In the scenario shown in FIG. 1, the global random forest model is trained through vertical federated learning, and the third-party server is not required to collect the information about the samples owned by the first participant 101 and the second participant 102 respectively and the intermediate information generated during the training process, so that the security of the sample and the training related data can be well protected.

Figure 3:
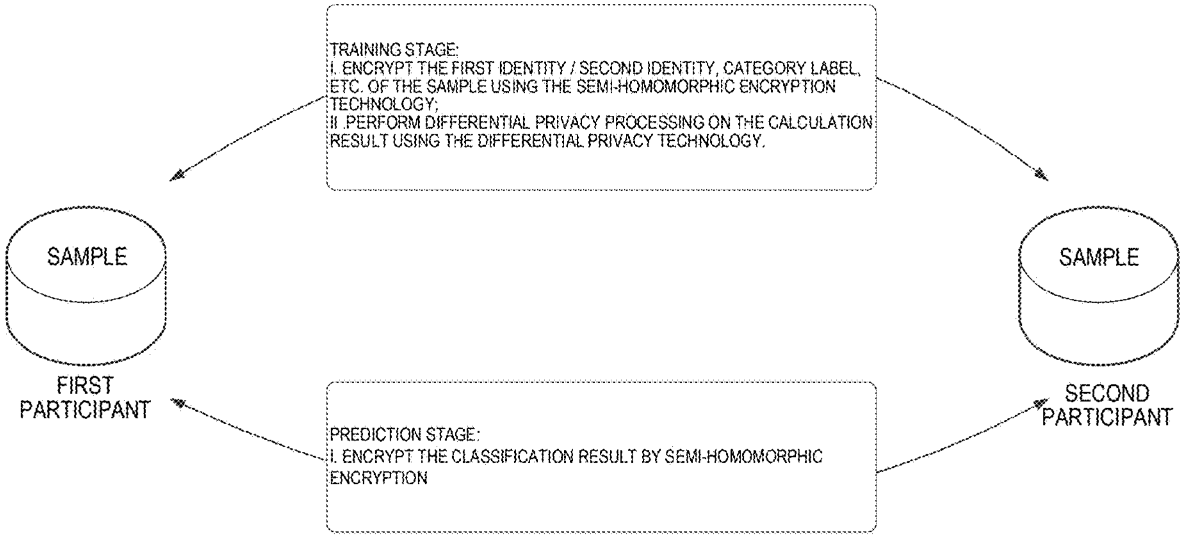
FIG. 3 is an overall block diagram of a method for vertical federated learning provided in an embodiment of the present disclosure.

FIG. 3 is a schematic diagram of an overall framework of a method for vertical federated learning provided in an embodiment of the present disclosure. Referring to FIG. 3, training is started, and the first participant and the second participant each determine, according to the depth of the node to be trained, the node type as a leaf node or an internal node; or, the first participant and the second participant interact to determine the number of training samples existing on the current node, then, in combination with the depth of the node to be trained and the number of training samples existing on the node to be trained, determine the node type as a leaf node or an internal node; if the node type of the node to be trained is a leaf node, the first participant and the second participant use the semi-homomorphic encryption technology and the differential privacy technology to interact to calculate the category of the node to be trained; if the node type of the node to be trained is an internal node, the first participant and the second participant use the semi-homomorphic encryption technology and the differential privacy technology to interact to calculate the split feature value of the node type of the node to be trained. Then, if the node to be trained is an internal node, the node to be trained is differentiated to the left and right child nodes according to the calculated split feature value, and then the node to be trained is updated to be any child node for training; if the node to be trained is a leaf node, the node to be trained is updated to be any child node of its sibling node for training, until node trainings of all decision trees included in the random forest model is completed.

Figure 4:
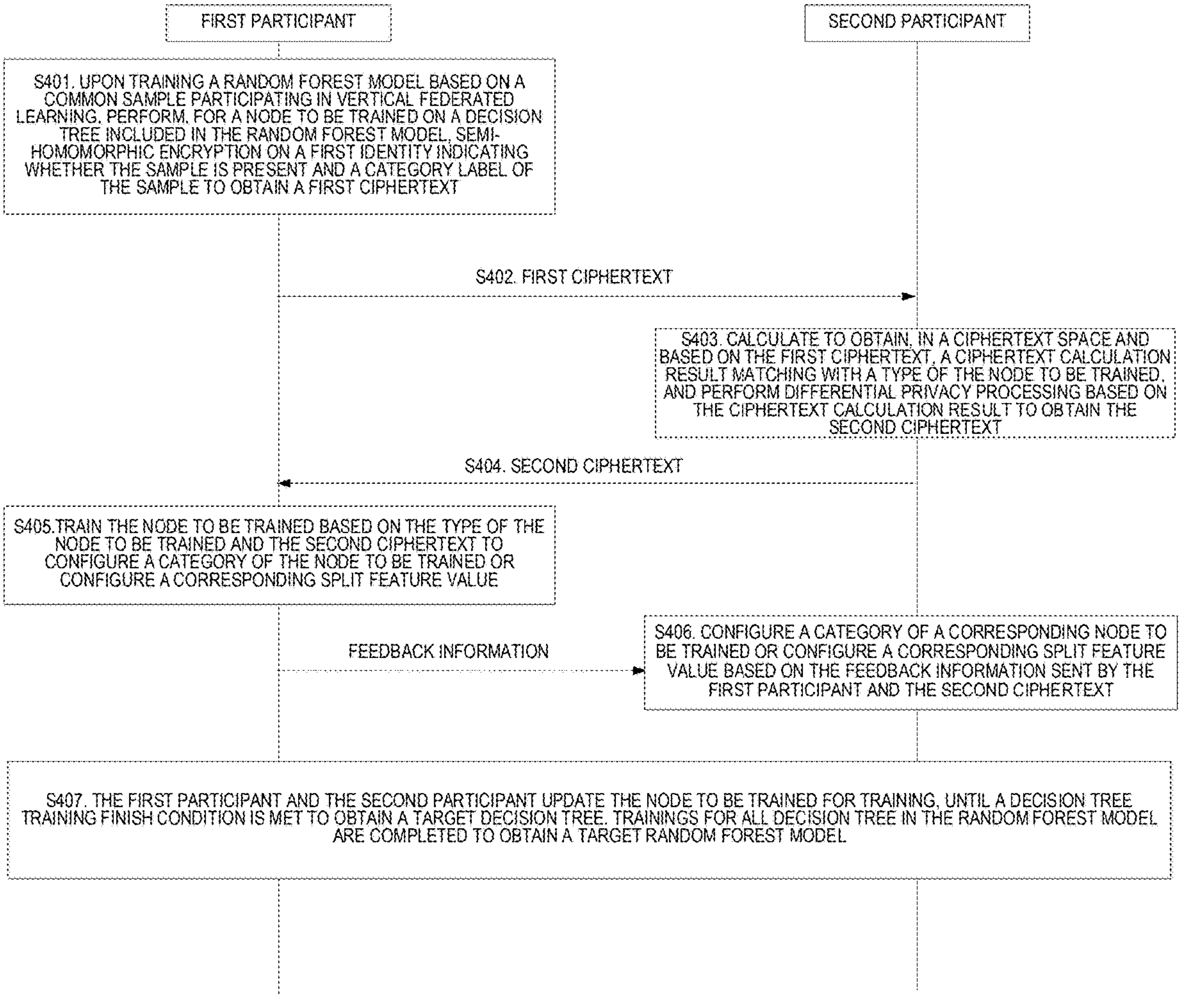
FIG. 4 is a flowchart of a method for vertical federated learning provided in an embodiment of the present disclosure.

FIG. 4 is a schematic flowchart of a method for vertical federated learning provided in an embodiment of the present disclosure. In the following embodiments, the first participant and the second participant performing the vertical federated learning are used as an example for description, where the first participant possesses a category label of the sample. Referring to FIG. 4, the method of this embodiment includes the following steps:

At S401: upon training a random forest model based on a common sample participating in vertical federated learning, the first participant performs, for a node to be trained on a decision tree included in the random forest model, semi-homomorphic encryption on a first identity indicating whether the sample is present and a category label of the sample to obtain a first ciphertext.

The number of common samples participating in the vertical federated learning can be multiple, and the first participant owns the first feature data and the category label of the sample. The sample may come from any field, any content; any storage format, and the present disclosure is not limited thereto.

At S402: The first participant sends the first ciphertext to the second participant.

The first identity is used to indicate whether the sample exists on the node to be trained of the random forest model of the first participant. It should be noted that, during the model training process, as the node to be trained is continuously updated, the sample is continuously split until the leaf node is reached, and the first identity of the sample is continuously updated. As an example, when the value of the first identity is 0, it indicates that the sample does not exist on the current node to be trained, and when the value of the first identity is 1, it indicates that the sample exists on the current node to be trained. It is assumed that the node 1 is the root node, the node 2 and the node 3 are the left and right child nodes of the node 1, when the sample is input to the node 1, the values of the first identities of all the samples are 1, and if the root node has a split feature value, then the sample is differentiated to the node 2 or node 3 according to the first feature data of the sample and the split feature value of the node 1, then the value of the first identity, on the node 2, of the sample that is differentiated to the node 2 is 1, and the value of the first identity, on the node 3, of the sample that is differentiated to the node 3 is 1, and the value of the first identity, on the node 2, of the sample that is differentiated to the node 3 is 0, and the value of the first identity, on the node 3, of the sample that is differentiated to the node 2 is 0.

The category label of the sample is used to indicate a category to which the sample belongs. Common samples participating in the vertical federated learning may belong to one of a plurality of categories, respectively.

As a possible implementation, for the node to be trained, the first participant may generate, for each sample, a category flag vector based on the category label of the sample and the first identity, where the category flag vector may indicate whether the sample exists on the node to be trained as well as a category of the sample; and after that, the first participant encrypts the category flag vector by using homomorphic encryption key possessed by the first participant, to obtain the encrypted category flag vector, and the first ciphertext includes the encrypted category flag vectors corresponding to each sample.

In addition, the first participant may splice the encrypted category flag vectors corresponding to respective samples into one vector and send the vector to the second participant, and the second participant my obtain the ciphertext calculation result matched with the type of the current node to be trained by calculating the spliced vector, thereby reducing the data processing quantity of the second participant and improving the training, efficiency.

Because the type of the node to be trained may be an internal node of the decision tree to which the node to be trained belongs, or may be a leaf node of the decision tree to which the node to be trained belongs, the second participant needs to obtain different ciphertext calculation results for different types based on the first ciphertext, and feed the ciphertext calculation results back to the first participant. The first participant may determine the type of the current node based on the depth of the node to be trained in the decision tree and the number of the samples exist on the node to be trained.

As an example, before training, the minimum splitting sample number and the maximum tree depth of the decision tree may be initialized. During training, the first participant may determine the type of the node to be trained according to the initialized maximum tree depth and the minimum splitting sample number, and may include the following cases.

1) if the depth of the node to be trained is greater than or equal to the maximum tree depth of the decision tree, the node to be trained will be a leaf node; 2) if the depth of the node to be trained is less than the maximum tree depth of the decision tree, and the number of training samples existing on the node to be trained is less than the minimum splitting sample number, the node to be trained will be a leaf node; 3) if the depth of the node to be trained is less than the maximum tree depth of the decision tree, and the number of training samples existing on the node to be trained is greater than or equal to the minimum splitting sample number, the node to be trained will be an internal node.

At S403: The second participant calculates to obtain, in a ciphertext space and based on the first ciphertext, a ciphertext calculation result matching with a type of the node to be trained, and performs differential privacy processing based on the ciphertext calculation result to obtain the second ciphertext.

The first participant may send the node type information to the second participant to indicate that the type of the node to be trained is a leaf node or an internal node, so that the second participant can obtain a correct ciphertext calculation result.

I. If the type of the node to be trained is a leaf node, the second participant calculates the encrypted sample number of each category according to the first ciphertext and the second identity indicating whether the sample exists, and the encrypted sample number of each category is the ciphertext calculation result. The encrypted sample number for a certain category refers to the number of samples that exist on the node to be trained in both the first participant and the second participant for the corresponding category. As an example, if the node a1 and the node a2 are nodes to be trained in the first participant and the second participant respectively, and the random forest model includes 5 categories, the number of samples that exist on both the node a1 and the node a2 simultaneously is calculated respectively for the 5 categories.

As a possible implementation, when the first ciphertext includes the encrypted category flag vector corresponding to each sample, the second participant may perform homomorphic multiplication processing on each element in the encrypted category flag vector of the same sample with the second identity of the sample, and the second identity is used to indicate whether the sample exists on a corresponding node to be trained in the second participant; then for each category, perform homomorphic addition processing on the elements corresponding to the category in each sample to obtain an initial encrypted sample number corresponding to each category, where the initial encrypted sample number is not subjected to differential privacy processing; and then generate differential privacy noise according to the predetermined sensitivity and the differential privacy budget, and then add the differential privacy noise to the initial encrypted sample in a homomorphic addition processing manner to obtain the encrypted sample number corresponding to each category included in the second ciphertext. The encrypted sample number corresponding to each category obtained by the second participant is the calculation performed in the ciphertext space, and the ciphertext calculation result to be sent to the first participant by the second participant is disturbed through differential privacy processing, so that the first participant cannot obtain the number of samples of the plaintext corresponding to each category, and thus the security of the training sample is protected.

II. If the type of the node to be trained is an internal node, the second participant split the samples according to the first ciphertext and the plurality of first random feature values to obtain a first sample split result; and obtains the ciphertext split gain of the second candidate split feature value according to a second sample split result sent by the first participant. The second sample split result is a ciphertext result obtained by splitting the sample and adding noise by the first participant according to the third ciphertext received in advance, the plurality of second random feature values and the category label of the sample; the third ciphertext is an encrypted flag vector obtained by performing semi-homomorphic encryption on the second identity by the second participant. The second participant decrypts the second sample split result by using the private key in the semi-homomorphic key pair to obtain a plurality of data items, and calculates and obtains, for each data item, an initial split gain of each second random feature by using a weighted manner, and then adds noise to the initial split gain of each second random feature value by using a differential privacy technology, to select an optimal local split gain, where the second random feature value corresponding to the optimal local split gain is the second candidate split feature. If the type of the node to be trained is the second ciphertext including: the first sample split result and the ciphertext split gain of the second candidate split feature value.

At S404: The second participant sends the second ciphertext to the first participant.

At S405: The first participant trains the node to be trained based on the type of the node to be trained and the second ciphertext to configure a category of the node to be trained or configure a corresponding split feature value.

In this step, the nodes to be trained in the decision tree corresponding to the first participant are configured.

If the type of the node to be trained is a leaf node, then the first participant decrypts the second ciphertext based on the semi-homomorphic private key to obtain an encrypted sample number corresponding respectively to each category and configures the category corresponding to the maximum encrypted sample number as the category of the node to be trained.

If the type of the node to be trained is an internal node, the first participant calculates a ciphertext split gain of the first candidate split feature according to the first sample split result included in the second ciphertext, where the first sample split result is a ciphertext result obtained by splitting the sample by the second participant based on the plurality of first random feature values and the first ciphertext; and configures the split feature value of the node to be trained by comparing the ciphertext split gain magnitude of the second candidate split feature indicated by the second ciphertext with that of the first candidate split feature.

At S406: The second participant configures a category of a corresponding node to be trained or configure a corresponding split feature value based on the feedback information sent by the first participant and the second ciphertext.

In this step, the nodes to be trained in the decision tree corresponding to the second participant are configured.

If the type of the node to be trained corresponding to the first participant is a leaf node, after the first participant configures the category of the leaf node, the category identity information (such as the numeric number of the category, the category ID, etc.) of the leaf node may be sent as feedback information to the second participant to configure the corresponding node to be trained in the second participant.

If the type of the node to be trained corresponding to the first participant is an internal node, the first participant generates a fourth ciphertext by performing differential privacy processing on the ciphertext split gain of the first candidate split feature, and sends the fourth ciphertext to the second participant as feedback information, and the second participant configures the split feature value of the node to be trained corresponding to the second participant by comparing the ciphertext split gain of the first candidate split feature with that of the second candidate split feature subjected to the differential privacy processing.

It should be noted that in steps S405 and S406, the ciphertext split gain of the first candidate split feature value is the local optimal split gain calculated by the first participant for the second participant, the ciphertext split gain of the second candidate split feature value is the local optimal split gain calculated by the second participant for the first participant, and the optimal split feature of the node to be trained may be determined by comparing the magnitudes of the local optimal split gains calculated by the first participant and the second participant for each other. In some embodiments, the smaller the split gain value, the better the performance of differentiating the sample to the left and right child nodes of the node to be trained based on the corresponding split feature value; then the candidate split feature value with the smaller split gain may be determined as the target split feature data corresponding to the current node. In the present disclosure, in order to ensure the security of the feature data of the sample, the feature value may not be sent to the counterparty, and thus if a party with a smaller ciphertext split gain sets the corresponding candidate split feature value as the split feature value of the node to be trained, a party with a larger ciphertext split gain will sets the corresponding node to be trained as an empty node, where the empty node refers to that the sample of this node will be transferred to the left and right child nodes, respectively, as it is.

In some other embodiments, if the larger the split gain value, the better the performance of differentiating the training sample to the left and right child nodes of the current node based on the corresponding split feature value; then the candidate split feature value with greater split gain may be determined as the target split feature data corresponding to the current node. The configuration manner is similar, and details are not described herein again.

At S407: The first participant and the second participant update the node to be trained for training, until a decision tree training finish condition is met to obtain a target decision tree. Trainings for all decision tree in the random forest model are completed to obtain a target random forest model.

In the method provided in this embodiment, upon the first participant and the second participant training a random forest model based on a common sample participating in vertical federated learning, for a node to be trained on a decision tree included in the random forest model, the plurality of participants encrypt an identity configured to indicate whether the training sample is present in the node to be trained by a semi-homomorphic encryption technology, and then send it to the counterparty, and a further participant calculates a required ciphertext calculation result in a ciphertext space; in addition, the ciphertext calculation result is processed using a differential privacy technology and fed back to the counterparty, ensuring the security of the issued ciphertext calculation result, avoiding reversely interfering from the ciphertext calculation result to obtain related information of the sample, and improving the security of the sample.

In the federated learning method provided in the present disclosure, when the node to be trained is an internal node, a split feature value of the node to be trained needs to be determined based on ciphertext split gains of two candidate split features separately calculated by the first participant and the second participant. The split gain of the first candidate split feature data is calculated by the first participant, and the split gain of the second candidate split feature data is obtained by the second participant. Next, an implementation of calculating two candidate split feature values is described by using the embodiments shown in FIG. 5 and FIG. 6.

Figure 5:
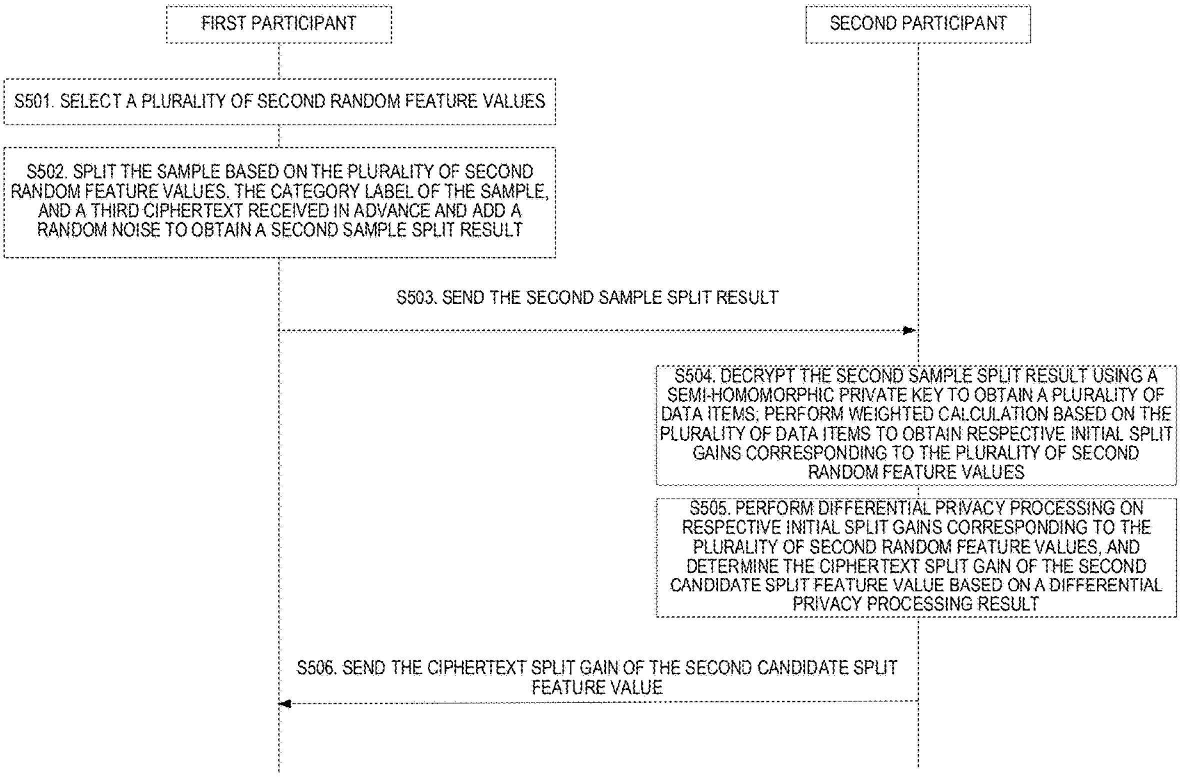
FIG. 5 is a flowchart of a method for vertical federated learning provided in another embodiment of the present disclosure.

FIG. 5 is a flowchart of a method for vertical federated learning provided in an embodiment of the present disclosure. The method in this embodiment mainly introduces how the first participant obtains the ciphertext split gain corresponding to the second candidate split feature value. Referring to FIG. 5, the method of this embodiment includes the following steps:

At S501: The first participant selects a plurality of second random feature values.

The first participant determines a first feature data of a plurality of dimensions according to the first feature data of each sample, and the first feature data of each dimension includes a plurality of feature values, that is, the second random feature value. Wherein, based on the first feature data of each sample, the feature value range of the first feature data of each dimension is first determined, the first feature data of the plurality of dimensions meeting the value range requirement may be selected, and then the second random feature values are determined in a random manner or in another manner (for example, in a manner of sorting in accordance with the feature value sizes).

At S502: The first participant splits the sample based on the plurality of second random feature values, the category label of the sample, and a third ciphertext received in advance and adds a random noise to obtain a second sample split result.

As a possible implementation, the following steps may be included:

At Step a1: The first participant differentiates each sample into a left child node and a right child node of the node to be trained according to the selected plurality of second random feature values, and obtains the sample number of the left and right child nodes respectively differentiated by each second random feature value.

As an example, assuming that the node to be trained is a node 1, the node 2 and the node 3 are respectively a left child node and a right child node of the node 1, first feature data of 3 dimensions are selected, 3 feature values are selected for the first feature data of each dimension based on a value range of the first feature data of each dimension, that is, 9 second random feature values are selected, the step of differentiating (i.e., splitting) the sample is performed once based on each second random feature value, so that samples in the node 1 are differentiated into the node 2 and the node 3, thereby obtaining a left and right child node sample number corresponding to the 9 second feature values.

As a possible implementation, when the first participant differentiates the sample to the left and right child nodes based on the selected second random feature value, a vector corresponding to the left child node and a vector corresponding to the right child node may be generated respectively based on the first identity of the sample, whether the first feature data of the sample satisfies the selected second random feature value and the category label of the sample.

At Step b1: The first participant performs homomorphic multiplication processing and homomorphic addition processing according to the third ciphertext and the left and right child node sample numbers corresponding to each second feature value to obtain a second sample split result, where the second sample split result includes the encrypted sample number of the left and right child nodes respectively corresponding to each second random feature value.

With reference to the example in step a, the first participant selects 9 second random feature values, assuming that the total number of categories of the random forest model is 5, and for each second random feature value, the first participant may differentiate each training sample to one of the node 2 and the node 3, and each sample exist on the node 2 may belong to one or more of the above described 5 categories, similarly, each sample exist on the node 3 may belong to one or more of the above described 5 categories; because some samples may not exist on the node 1 in the second participant, the training samples may not be differentiated to the node 2 or the node 3, and thus the sample numbers differentiated to the left and right child nodes based on each second random feature value need to be modified, according to the second identity of each sample in the second participant on the corresponding node corresponding to the node 1, to obtain the sample number with a relatively high accuracy. Taking the left child node as an example, for each selected second random feature value, the first participant performs homomorphic multiplication processing and homomorphic addition processing with respect to the sample differentiated to the left child node based on the second random feature value, category labels of each sample differentiated to the left child node, and the third ciphertext, so that the modified sample number of each category in the left child node can be obtained; and the processing manner of the right child node is similar to that of the left child node.

At S503: The first participant sends a second sample split result to the second participant.

At S504: The second participant decrypts the second sample split result using a semi-homomorphic private key to obtain a plurality of data items; performs weighted calculation based on the plurality of data items to obtain respective initial split gains corresponding to the plurality of second random feature values.

At S505: The second participant performs differential privacy processing on respective initial split gains corresponding to the plurality of second random feature values, and determines the ciphertext split gain of the second candidate split feature value based on a differential privacy processing result.

The second participant may add differential privacy noise to the initial split gains corresponding to each second random feature value according to a predetermined sensitivity and a differential privacy budget, and determine a locally optimal ciphertext split gain from the ciphertext split gain added with the differential privacy noise, where the second random feature value corresponding to the locally optimal ciphertext split gain is the second candidate split feature value.

At S506: The second participant sends the ciphertext split gain of the second candidate split feature value to the first participant. Correspondingly, the first participant receives the ciphertext split gain corresponding to the second candidate split feature value.

In this embodiment, the first participant and the second participant interact data with each other through semi-homomorphic encryption and differential privacy processing, and calculate an optimal split feature value for the node to be trained that is being trained, and because the first participant does not send the information of the second random feature value to the second participant, the security of the feature data of the sample in the interaction process is effectively protected.

Figure 6:
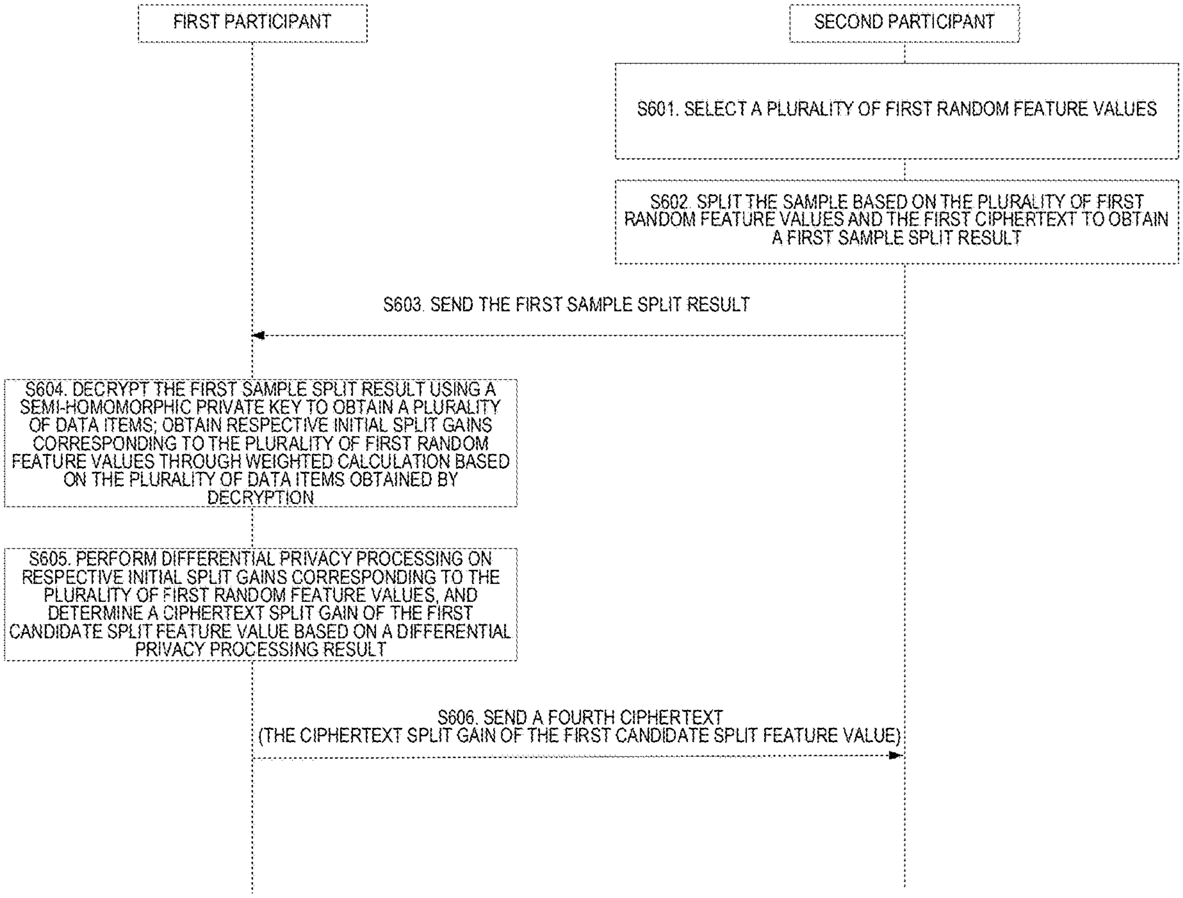
FIG. 6 is a flowchart of a method for vertical federated learning provided in another embodiment of the present disclosure.

FIG. 6 is a flowchart of a method for vertical federated learning provided in another embodiment of the present disclosure. The method in this embodiment mainly introduces how the second participant obtains the ciphertext split gain corresponding to the first candidate split feature value. Referring to FIG. 6, the method of this embodiment includes the following steps:

At S601: The second participant selects a plurality of first random feature values.

The second participant determines second feature data of a plurality of dimensions based on the second feature data of each sample, and the second feature data of each dimension includes a plurality of feature values, that is, the first random feature value. The value range of the feature value of the second feature data of each dimension is determined first based on the second feature data of each sample, the second feature data of a plurality of dimensions meeting the value range requirement may be selected, and then the plurality of first random feature values are determined in a random manner or in another manner (for example, in a manner of sorting in accordance with the feature value sizes).

At S602: The second participant splits the sample based on the plurality of first random feature values and the first ciphertext to obtain a first sample split result.

As a possible implementation, the following steps may be included:

At Step a2: The second participant differentiates each sample into a left child node and a right child node of a corresponding node to be trained in the second participant according to the selected plurality of first random feature values.

As a possible implementation, when the second participant differentiates based on the selected first random feature value, a vector corresponding to the left child node and a vector corresponding to the right child node may be respectively generated based on the second identity of the sample and whether the second feature data of the sample meets the selected first random feature value.

At Step b2: The second participant calculates, according to the first ciphertext and the result obtained in step a2, the encrypted sample number of the left and right child nodes that are differentiated by each first random feature value, that is, the first sample split result.

In step b2, since the first ciphertext can indicate that the sample is on a corresponding node to be trained in the first participant, when calculating the encrypted sample number, the first ciphertext is used for calculation, which is equivalent to implementing the need to correct, according to the first identity of the sample, the sample number of the left and right child nodes that are differentiated based on each first random feature value, to obtain the sample number with relatively high accuracy.

At S603: The second participant sends a first sample split result to the first participant.

At S604: The first participant decrypts the first sample split result using a semi-homomorphic private key to obtain a plurality of data items, and obtains respective initial split gains corresponding to the plurality of first random feature values through weighted calculation based on the plurality of data items obtained by decryption.

At S605: The first participant performs differential privacy processing on respective initial split gains corresponding to the plurality of first random feature values, and determines a ciphertext split gain of the first candidate split feature value based on a differential privacy processing result.

The first participant may add differential privacy noise to the initial split gain corresponding to each first random feature value according to a predetermined sensitivity and a differential privacy budget, and determine a locally optimal ciphertext split gain from the ciphertext split gain added with the differential privacy noise, where the first random feature value corresponding to the locally optimal ciphertext split gain is the first candidate split feature value.

At S606: The first participant sends the ciphertext split gain of the first candidate split feature value to the second participant. Correspondingly, the second participant receives the ciphertext split gain corresponding to the first candidate split feature value.

In this embodiment, the first participant and the second participant interact data with each other through semi-homomorphic encryption and differential privacy processing, and calculate an optimal split feature value for the node to be trained that is being trained, and because the second participant does not send the information of the first random feature value to the first participant, the security of the feature data of the sample in the interaction process is effectively protected.

In a specific embodiment, it is assumed that two participants are Guest (hereinafter referred to as G) and Host (hereinafter referred to as H), where the data form of the sample owned by G is: <id, $f_1$, $f_2$, . . . , $f_{n1}$>, and the data form of the sample owned by H is: <id, $f_1'$, $f_2'$, . . . , $f_{n2}'$). That is, each sample contains an id and a plurality of feature values, and the features respectively owned by G and H are different. G and H have N samples in common.

It should be noted that the id of the same sample in G is the same as that in H, which also provides a basis for identifying related information of the same sample when the G and H interact in the future.

The training stage may include the following steps.

At Step 1: Initialize related parameters.

As an example, the user may set a differential privacy budget$|_\varepsilon$, feature data selection number p, the number of feature values included in each dimension of feature data q, a minimum splitting sample number $I_{min}$, and a maximum depth of the decision tree$d_{max}$.

At Step 2: G and H add a flag bit t/t' (that is, a first identity/a second identity) to each sample, the value of the flag bit being 1 indicates that a sample exists, and the value of the flag bit being 0 indicates that the sample does not exist. Therefore, the data form of the sample owned by G is: <id, $f_1$, $f_2$, . . . , $f_{n1}$, t>, and the data form of the sample owned by H is <id, $f_1'$, $f_2'$, . . . , $f_{n2}'$, t'>. Initially, the values of the flag bits of all samples on the root node are 1. In addition, G and H respectively initialize their corresponding public and private keys ($pk_G$, $sk_G$) and ($pk_H$,$sk_H$) for semi-homomorphic encryption, respectively.

At Step 3: Determine a depth d of the node to be trained, and if the depth d of the node to be trained is less than the maximum depth $d_{max}$, jump to step 4; and if the depth d of the node to be trained is equal to the maximum depth $d_{max}$, perform the following step 3.1 to step 3.5.

At Step 3.1: For each category $c_1, c_2, \ldots, c_l$ (l representing the total number of categories), G obtains a category flag vector $<id, t_{c_1}, t_{c_2}, \ldots, t_{c_i}, \ldots, t_{c_l}>$ of the sample according to the category label of the sample, where $t_{c_i}=t\wedge(c_{id}=c_i)$, $c_{id}$ represents the category label of the sample. $\wedge$ represents a logical AND operation.

At Step 3.2: The G performs semi-homomorphic encryption on the category flag vector of each sample by utilizing a public key $pk_G$, to obtain a ciphertext category flag vector of each sample, and sends the ciphertext category flag vector to H. The ciphertext category flag vector of the N samples may be expressed as follows:

$<id_1, E_{pk_G}(t_{1,c_1}), E_{pk_G}(t_{1,c_2}), \ldots, E_{pk_G}(t_{1,c_l})>, \ldots, <(id_N, E_{pk_G}(t_{N,c_1}), E_{pk_G}(t_{N,c_2}), \ldots, E_{pk_G}(t_{N,c_l})>$ At Step 3.3: H obtains the encrypted sample number corresponding to each category through homomorphic addition processing and homomorphic multiplication processing according to sample flag vectors (vector composed of flag bits t') of the sample of the local end and ciphertext category flag vectors sent by G. It should be noted that the encrypted sample number obtained at this time has not been subjected to differential privacy processing.

Herein, the category flag vector of the sample owned by H is represented as following formula:

$$\langle id_1, t_1' \rangle, \langle id_2, t_2' \rangle, \ldots, \langle id_N, t_N' \rangle$$

The process of obtaining the encrypted sample number of each category by H is represented as following formula:

$$[I_{c_1}] = (E_{pk_G}(t_{1,c_1}) \otimes t_1') \oplus \ldots \oplus (E_{pk_G}(t_{N,c_1}) \otimes t_N')$$

$$[I_{c_2}] = (E_{pk_G}(t_{1,c_2}) \otimes t_1') \oplus \ldots \oplus (E_{pk_G}(t_{N,c_2}) \otimes t_N')$$

$$\ldots$$

$$[I_{c_N}] = (E_{pk_G}(t_{1,c_N}) \otimes t_1') \oplus \ldots \oplus (E_{pk_G}(t_{N,c_N}) \otimes t_N')$$

Then, the H generates differential privacy noise according to the predetermined sensitivity s and the differential privacy budget ε, and adds differential privacy noise to the encrypted sample numbers of each category. The differential privacy processing procedure may be expressed as follows:

$$[I_{c_1}^*] = L_{\varepsilon,s}(0) \oplus [I_{c_1}]$$

$$[I_{c_2}^*] = L_{\varepsilon,s}(0) \oplus [I_{c_2}]$$

$$\ldots$$

$$[I_{c_N}^*] = L_{\varepsilon,s}(0) \oplus [I_{c_N}]$$

H will send $$[I_{c_1}^*], [I_{c_2}^*], \ldots, [I_{c_N}^*]$$

to G.

At Step 3.4: G receives $$[I_{c_1}^*], [I_{c_2}^*], \ldots, [I_{c_N}^*]$$

and decrypts it by using the private key $sk_G$ to obtain:

$$I_{c_1}^* = D_{pk_G}([I_{c_1}^*]), I_{c_2}^* = D_{pk_G}([I_{c_2}^*]), \ldots, I_{c_N}^* = D_{pk_G}([I_{c_N}^*]),$$

and set the category of the node to be trained as $$c = \text{argmax}_{c_i}(I_{c_i}^*).$$

At Step 3.5: Return to the node, where the node to be trained is a leaf node, and a category of the leaf node is a category determined in step 3.4.

At Step 4: G and H interact to calculate the sample numbers exist on the node to be trained.

As an example, it may be implemented by the following steps 4.1 to 4.3.

At Step 4.1: G performs semi-homomorphic encryption on the flag bits of each sample in the sample set by using the public key in the homomorphic key pair to obtain a ciphertext flag vector corresponding to each sample, which is represented by the formula: $<id_1, E_{pk_G}(t_1)>, <id_2, E_{pk_G}(t_2)>, \ldots, <id_N, E_{pk_G}(t_N)>$, and G sends the ciphertext flag vector to H.

At Step 4.2: H searches, according to the id of each sample, the flag bit of the same sample in the local end, and performs homomorphic addition processing and homomorphic multiplication processing to obtain and calculate the encrypted sample number of the node to be trained, which can be represented by the formula as follows:

$$[I] = (E_{pk_G}(t_1) \otimes t_1') \oplus (E_{pk_G}(t_2) \otimes t_2') \oplus \ldots \oplus (E_{pk_G}(t_N) \otimes t_N')$$

H generates differential privacy noise according to a predetermined sensitivity s and a differential privacy budget ε, and uses the differential privacy noise to perturb the encrypted sample number of the node to be trained. The processing procedure can be represented by the formula as follows: $[I^*]=L_{\varepsilon,s}(0)\oplus[I]$, and sends [I*] to G.

At Step 4.3: G decrypts to obtain the sample number of the node to be trained $I^*=D_{sk_G}([I^*])$.

If I* is smaller than $I_{min}$, then step 3.1 to step 3.5 are performed to set a category for the node to be trained; if I* is greater than $I_{min}$, then step 5 is performed to set a split feature value for the node to be trained.

At Step 5, G and H interact to calculate a split feature value of the node to be trained.

As an example, the following steps 5.1 to 5.11 may be included.

At Step 5.1: H uses the key $pk_H$ to perform semi-homomorphic encryption on the flag bit on the node currently being trained in H for each sample in H to obtain the ciphertext flag vector of each sample, $<id_1, E_{pk_H}(t_1')>, <id_2, E_{pk_H}(t_2')>, \ldots, <id_N, E_{pk_H}(t_N')$, and sends the ciphertext flag vector to G.

At Step 5.2: For each category $c_1, c_2, \ldots, c_l$ (l representing the total number of categories), G obtains a category flag vector of the sample <id, $t_{c_1}$, $t_{c_2}$, . . . , $t_{c_i}$, . . . , $t_{c_l}$) according to the category label of each sample, where $t_{c_i}=t\wedge(c_{id}=c_i)$, and $c_{id}$ represents a category to which the sample belongs, that is, a category label corresponding to the sample, and t represents a value of a flag bit of the sample.

G performs semi-homomorphic encryption on the category flag vector of each sample to obtain a ciphertext category flag vector of each sample and sends it to H. Reference may be made to the description of step 3.2.

At Step 5.3: H randomly selects feature data of p dimensions, and the feature data of each dimension selects q feature values, denoted as $$\{f^*_{x_i,y_j} \mid 1 \le i \le p,\ 1 \le j \le q\},$$

where $1\le x_i\le n_2$ and $1\le y_j\le N$. For each selected feature value $$f^*_{x_i,y_j},$$

H determines that each sample is differentiated to left and right child nodes based on the feature value $$f^*_{x_i,y_j},$$

and generates a corresponding result:

$$\langle id,\ t'_{left}\rangle,\ \langle id,\ t'_{right}\rangle, \text{ where,}$$

$$t'_{left} = t' \wedge \left(f'_{x_i} \le f^*_{x_i,y_j}\right),\ t'_{right} = t' \wedge \left(f'_{y_j} > f^*_{x_i,y_j}\right).$$

At Step 5.4: H calculates the encrypted sample number of the left and right child nodes differentiated by each feature value according to the information received in step 5.2, which may be represented as:

$$[J_{x_i,y_j}] = \{[I_{c_1,left}],\ [I_{c_1,right}],\ \dots,\ [I_{c_l,left}],\ [I_{c_l,right}]\}.$$

Herein, $$[I_{c_1,left}] = \left(E_{pk_G}(t_{1,c_i}) \otimes t'_{1,left}\right) \oplus \dots \oplus \left(E_{pk_G}(t_{N,c_i}) \otimes t'_{N,left}\right);$$

$$[I_{c_i,right}] = \left(E_{pk_G}(t_{1,c_i}) \otimes t'_{1,right}\right) \oplus \dots \oplus \left(E_{pk_G}(t_{N,c_i}) \otimes t'_{N,right}\right).$$

H sends the encrypted sample number, $\{[J_{x_i,y_j}] \mid 1\le i\le p, 1\le j\le q\}$, of the left and right child nodes corresponding to all the feature values to G.

At Step 5.5: G randomly selects feature data of p dimensions, and the feature data of each dimension selects q feature values, denoted as $$\{f^*_{x_i,y_j} \mid 1 \le i \le p,\ 1 \le j \le q\},$$

where $1\le x_i\le n_2$ and $1\le y_j\le N$. For each selected feature value $$f^*_{x_i,y_j},$$

G determine that each sample is differentiated to left and right child nodes based on the feature value $$f^*_{x_i,y_j},$$

and combines the category label of the sample and generates a corresponding result:

$$\langle id,\ t'_{left,c_1},\ t'_{left,c_2},\ \dots,\ t'_{left,c_l}\rangle,\ \langle id,\ t'_{right,c_1},\ t'_{right,c_2},\ \dots,\ t'_{right,c_l}\rangle.$$

Herein, $$t_{left,c_i} = t \wedge \left(f_{x_i} \le f^*_{x_i,y_j}\right) \wedge (c_{id} = c_i),\ t_{right} = t \wedge \left(f_{y_j} > f^*_{x_i,y_j}\right) \wedge (c_{id} = c_i).$$

At Step 5.6: G calculates the encrypted sample number of the left and right child nodes differentiated by each feature value according to the information received in step 5.1, which may be represented as:

$$[J^*_{x_i,y_j}] = \{[I'_{c_1,left}],\ [I'_{c_1,right}],\ \dots,\ [I'_{c_l,left}],\ [I'_{c_l,right}]\}.$$

Herein, $$[I'_{c_1,left}] = \left(E_{pk_G}(t'_1) \otimes t_{1,left,c_i}\right) \oplus \dots \oplus \left(E_{pk_G}(t'_N) \otimes t_{N,left,c_i}\right);$$

$$[I'_{c_i,right}] = \left(E_{pk_G}(t'_1) \otimes t_{1,right,c_i}\right) \oplus \dots \oplus \left(E_{pk_G}(t'_N) \otimes t_{N,right,c_i}\right).$$

G sends the encrypted sample number, $$\{[J^*_{x_i,y_j}] \mid 1 \le i \le p,\ 1 \le j \le q\},$$

of the left and right child nodes corresponding to all the feature values to H.

At Step 5.7: G and H use respective homomorphic private keys to decrypt each one of $[J_{x_i,y_j}]$ and $$[J^*_{x_i,y_j}],$$

respectively.

At Step 5.8: G and H respectively calculate the split gain of each feature value according to the following formula:

$$g(J_{x_i,y_j}) = \left(1 - \sum_{c_i}\left(\frac{I_{c_i,left}}{I_{left}}\right)^2\right) \cdot \frac{I_{left}}{I_{left} + I_{right}} + \left(1 - \sum_{c_i}\left(\frac{I_{c_i,right}}{I_{right}}\right)^2\right) \cdot \frac{I_{right}}{I_{left} + I_{right}}$$

herein, $I_{left}=\Sigma_{c_j} I_{c_j,left}$, $I_{right}=\Sigma_{c_j} I_{c_j,right}$. When G is calculating, use I' to replace I.

In the present disclosure, the smaller the split gain, the better the performance of splitting the sample to the left and right child nodes, and the closer the corresponding feature value is to the optimal local split gain.

At Step 5.9: G and H use the differential privacy technology to add the split gain of each feature value with the differential privacy noise respectively, which is expressed by the formula as: $\tilde{g}=L_{\epsilon,s}(g)$. Then, the optimal local split $\tilde{g}_{min,G}$, $\tilde{g}_{min,H}$ are selected to send to the counterparty. Both G and H compare the optimal local split gain sent by the counterparty with the optimal local split gain calculated by the local end, and select the feature value corresponding to the smaller one of the split gains as the split feature value of the node to be trained.

In step 5.9, the sensitivity of the differential privacy noise may be obtained in the following manner.

At Step a1: the sensitivity s is initially set to 0, and the initial split gain $g_0$ is calculated according to the formula in step 5.8.

At Step a2: for any of $I \in J_{x_i,y_j}$, amending I to $I=I\pm1$, and calculating change gains $g_+$, $g_-$, according to the formula in step 5.8; and if $|g_+-g_0|>s$, then $s=|g_+-g_0|$; if $|g_--g_0|>s$, then $s=|g_--g_0|$.

At Step 5.10: According to the optimal split gain of $\tilde{g}_{min,G}$ and $\tilde{g}_{min,H}$, the corresponding participant (the participant that owns the feature value corresponding to the optimal split gain) uses the feature value corresponding to the split gain as the splitting feature value of the node to be trained to split the sample of the node to be trained into the left and right child nodes. For example, the split feature value corresponding to the node to be trained is $$f^*_{x_i,y_j},$$

if the feature value of the sample being $$f_{x_i} \le f^*_{x_i,y_j},$$

the flag bit of the sample in the left child node is set as $t=t\wedge 1$, and the flag bit of the sample in the right child node is set as t=0; if the feature value of the sample being $$f_{x_i} > f^*_{x_i,y_j},$$

the flag bit of the sample in the left child node is set as t=0, and the flag bit of the sample in the right child node is set as $t=t\wedge 1$.

For a participant that does not own the feature value corresponding to the optimal split gain, the node to be trained may be set to be an empty node, and all samples existing on the node to be trained are respectively transferred to the left and right child nodes.

At Step 5.11: Return to the node.

Because the node to be trained has the left and right child nodes, the left child node or the right child node may be the node to be trained, and the process returns to step 3 to train the updated node to be trained.

The trained target random forest model is obtained by continuously updating and training the nodes to be trained until all nodes in all decision trees included in the random forest model in G and H are trained.

Figure 7:
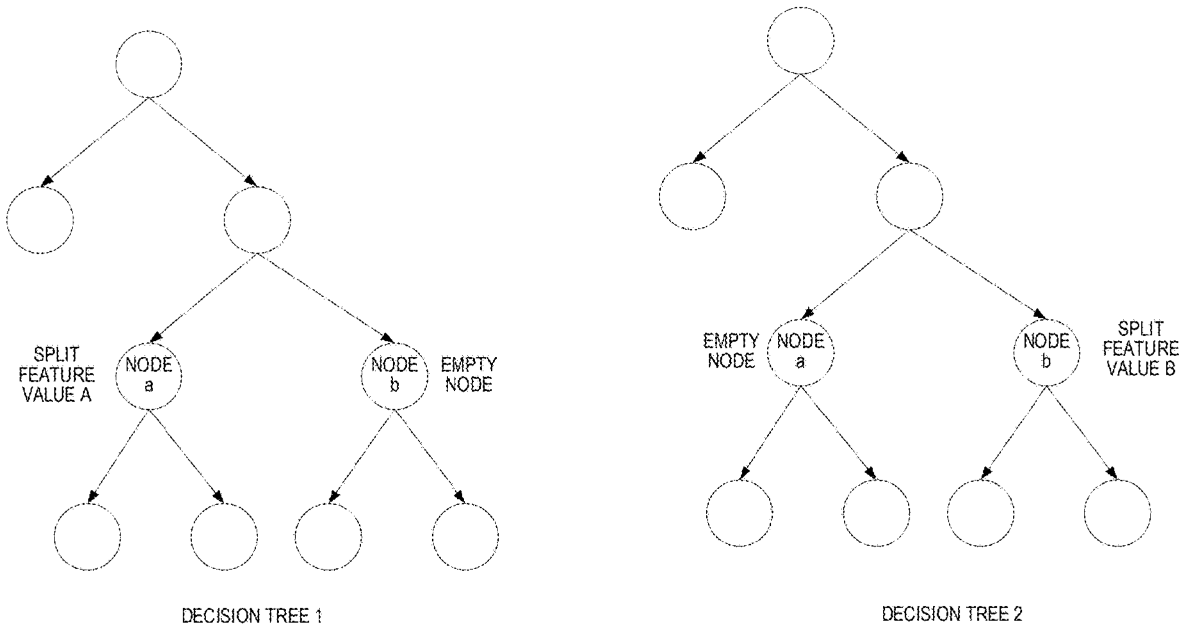
FIG. 7 is a schematic structural diagram of a target random forest model provided in an embodiment of the present disclosure.

On the basis of step 1 to step 5 in this embodiment, G and H may train to obtain a global random forest model. It can be learned from the description in the foregoing step 5.10 that, for a participant that owns the target split feature value, the sample may be differentiated, according to the target split feature value, to the left and right child nodes, in order to ensure the security of the sample, the target split feature value is not sent to the other participant, and the participant that does not own the target split feature value may set the node to be trained to be an empty node, as an example, therefore, the same decision tree in the trained target random forest model is different in the two participants. As an example, the embodiment shown in FIG. 7 is a schematic structural diagram of a same decision tree in G and H, respectively. The structure of a decision tree in G is shown as decision tree 1 in FIG. 7, the structure of the corresponding decision tree in H is shown as decision tree 2 in FIG. 7, node a is an internal node in the decision tree, where the node a has a corresponding splitting feature value A in decision tree 1, while node a is an empty node in decision tree 2. Node b is another internal node in the decision tree 1 where node b is an empty node in decision tree 1 while node b has a corresponding split feature value B in decision tree 2. That is, G owns the split feature value A of the node a, and H owns the split feature value B of the node b.

In addition, G owns the category information of the leaf node, in order to ensure the security of the sample and the security of the object to be classified, G may send the identity (such as the digital number) of the category corresponding to the leaf node to H, and H configures the received category identity as the category of the leaf node, and during prediction, H may return the identity (such as a digital number) of the category and the id of the sample reaching the node or the id of the object to be classified to G.

Next, the two participants may predict the category of the object to be classified according to the trained random forest model. As an example, the following steps may be included:

Assuming that the first participant (for example, G) owns the first feature data of the object to be classified, and in the case that the flag bit is included, the data form may be expressed as: $\langle id, f_1, f_2, \ldots, f_{n1}, t\rangle$; the second participant (for example, H) owns the second feature data of the object to be classified, and in the case that the flag bit is included, the data form may be as:

$$\langle id, f_1', f_2', \ldots, f_{n2}', t'\rangle.$$

Starting from the root node, if the node in the decision tree has a split feature value, the object to be classified is differentiated into the left and right child nodes based on the split feature value of the node and the feature value of the object to be classified; and if the node in the decision tree is an empty node, the object to be classified is respectively transferred to the left and right child nodes.

When the object to be classified reaches the leaf node, the first participant encrypts the flag bit of the object to be classified to obtain $\langle id, E_{pk_G}(t)\rangle$ as a ciphertext classification result and send it to the second participant.

The second participant performs homomorphic multiplication processing according to the flag bit t' of the object to be classified in the corresponding leaf node to obtain a fusion result, and then the second participant sends the fusion result to the first participant. It should be noted that, the first participant may further send the identity of the leaf node (for example, the digital number of the category corresponding to the leaf node) to the second participant, so that the second participant performs determination according to the identity of the leaf node and performs correct fusion.

The first participant decrypts the received fusion according to the private key in the homomorphic key pair, and if the decryption results $t' \cdot t = 1$, sets the category of the object to be classified as the category of the leaf node currently reached; and if the decryption results $t' \cdot t \neq 1$, continues to determine the next leaf node until the category of the object to be classified is determined.

As an example, an embodiment of the present disclosure further provides an apparatus for vertical federated learning.

Figure 8:
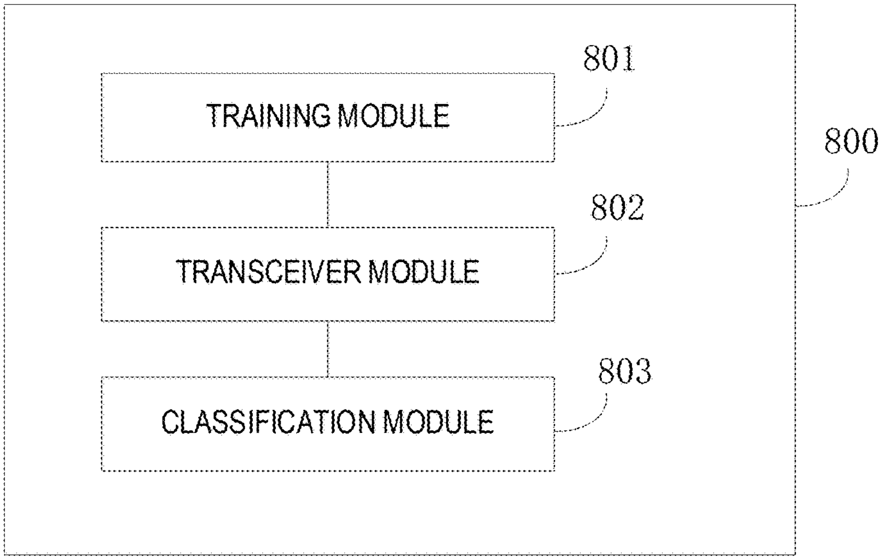
FIG. 8 is a schematic structural diagram of an apparatus for vertical federated learning provided in an embodiment of the present disclosure.

FIG. 8 is a schematic structural diagram of an apparatus for vertical federated learning provided in an embodiment of the present disclosure. Referring to FIG. 8, the apparatus for vertical federated learning 700 provided in this embodiment includes:

- a training module 801, configured to upon training a random forest model based on a common sample participating in vertical federated learning, perform, for a node to be trained on a decision tree included in the random forest model, semi-homomorphic encryption on a first identity indicating whether the sample is present and a category label of the sample to obtain a first ciphertext;
- a transceiver module 802, configured to send the first ciphertext to a further participant to enable the further participant to calculate to obtain, in a ciphertext space and based on the first ciphertext, a ciphertext calculation result matching with a type of the node to be trained;
- the transceiver module 802 being further configured to receive a second ciphertext sent by the further participant;
- the training module 801 being further configured to train the node to be trained based on the type of the node to be trained and the second ciphertext to configure a category of the node to be trained or configure a corresponding split feature value, the second ciphertext comprising a result obtained by performing differential privacy processing on the ciphertext calculation result by the further participant; update, for the decision tree, the node to be trained for training, until a decision tree training finish condition is met, to obtain a target decision tree, trainings for all decision tree in the random forest model being completed to obtain a target random forest model.

In some possible designs, the training module 801 is specifically configured to:

- if the type of the node to be trained is a leaf node, configuring the category of the node to be trained based on encrypted sample numbers of respective categories indicated by the second ciphertext;
- if the type of the node to be trained is an internal node, calculating a ciphertext split gain of a first candidate split feature based on a first sample split result included in the second ciphertext, the first sample split result being a ciphertext result obtained by splitting the sample by the further participant based on a plurality of first random feature values and the first ciphertext; and configuring a split feature value of the node to be trained by comparing a ciphertext split gain of a second candidate split feature indicated by the second ciphertext with the ciphertext split gain of the first candidate split feature.

In some possible designs, before performing the semi-homomorphic encryption on the first identity indicating whether the sample is present and the category label of the sample to obtain the first ciphertext, the training module 801 is further configured to: obtain a node depth of the node to be trained in the decision tree to which the node to be trained belongs; if the node depth is equal to a predetermined maximum tree depth, determine the node to be trained as a leaf node of the decision tree to which the node to be trained belongs; if the node depth is less than the predetermined maximum tree depth, obtain an encrypted sample total number of the node to be trained returned by the further participant; if the encrypted sample total number is less than a predetermined minimum split sample number, determine the node to be trained as a leaf node of the decision tree to which the node to be trained belongs; if the encrypted sample total number is greater than or equal to the predetermined minimum split sample number, determine the node to be trained as an internal node of the decision tree to which the node to be trained belongs.

In some possible designs, the training module 801 is specifically configured to: obtain a category flag vector of the sample by a logical AND operation based on the first identity of the sample and the category label; and perform semi-homomorphic encryption on the category flag vector of the sample based on a semi-homomorphic public key to obtain the first ciphertext.

In some possible designs, the training module 801 is specifically configured to: decrypt the second ciphertext based on a semi-homomorphic private key to obtain an encrypted sample number corresponding to respective categories, and configuring a category corresponding to a maximum encrypted sample number as the category of the node to be trained.

In some possible designs, the training module 801 is specifically configured to: decrypt the first sample split result based on a semi-homomorphic private key to obtain a plurality of data items, the plurality of data items being configured to indicate encrypted sample numbers of a left node and a right node obtained by the further participant splitting the sample based on the plurality of first random feature values; perform weighted calculation based on the plurality of data items to obtain respective initial split gains corresponding to the plurality of first random feature values; perform differential privacy processing on respective initial split gains corresponding to the plurality of first random feature values to obtain respective ciphertext split gains, and determining a first candidate feature value from the plurality of first random feature values, and obtaining the ciphertext split gain of the first candidate feature value.

In some possible designs, before receiving the second ciphertext sent by the other participant, the training module 801 is further configured to: select a plurality of second random feature values, and splitting the sample based on the plurality of second random feature values, the category label of the sample, and a third ciphertext received in advance and adding a random noise to obtain a second sample split result; and send the second sample split result to the further participant to enable the further participant to calculate the ciphertext split gain of the second candidate split feature based on the second sample split result.

In some possible designs, the transceiver module 802 is further configured to: if the type of the node to be trained is a leaf node, send category identity information of the node to be trained to the further participant; if the type of the node to be trained is an internal node, perform differential privacy processing on the ciphertext split gain of the first candidate split feature value to obtain a fourth ciphertext, and send the fourth ciphertext to the further participant to enable the further participant to configure a corresponding node to be trained in a random forest model corresponding to the further participant based on the fourth ciphertext.

In some possible designs, the apparatus further includes: a classification module 803, configured to input an object to be classified into the target random forest model, upon the object to be classified reaching a leaf node, perform semi-homomorphic encryption on a first identity of the object to be classified at the leaf node to obtain a ciphertext classification result.

The transceiver module 802 is further configured to send the ciphertext classification result to the other participant; and receive a fusion result fed back by the further participant, the fusion result being obtained by fusing the ciphertext classification result and a second identity of the object to be classified at a corresponding node in the further participant.

The classification module 803 is further configured to: if the fusion result meets a predetermined condition, determine a category of the object to be classified as a category of a leaf node currently reached; if the fusion result does not meet the predetermined condition, continue to determine a next leaf node which the object to be classified reaches, until the category of the object to be classified is determined.

The apparatus provided in this embodiment may be configured to implement the steps performed by the first participant in the foregoing method embodiments, and implementation principles and technical effects thereof are similar, and reference may be made to the detailed description of the foregoing method embodiments. For the sake of brevity, it will not be repeated here.

Figure 9:
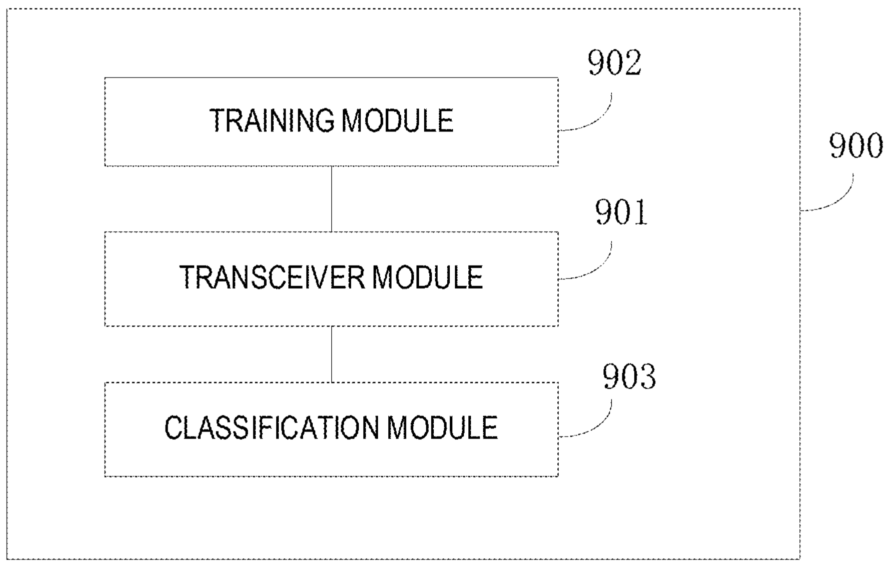
FIG. 9 is a schematic structural diagram of an apparatus for vertical federated learning provided in another embodiment of the present disclosure.

FIG. 9 is a schematic structural diagram of an electronic device provided in an embodiment of the present disclosure. Referring to FIG. 9, an electronic device 900 provided in this embodiment includes:

- a transceiver module 901, configured to upon training a random forest model based on a common sample participating in vertical federated learning, receive, for a node to be trained on a decision tree included in the random forest model, a first ciphertext sent by a further participant, the first ciphertext being obtained by performing semi-homomorphic encryption on a first identity indicating whether the sample is present and a category label of the sample by the further participant;
- a training module 902, configured to calculate to obtain, in a ciphertext space and based on the first ciphertext, a ciphertext calculation result matching with a type of the node to be trained, and perform differential privacy processing based on the ciphertext calculation result to obtain a second ciphertext;
- the transceiver module 901 being further configured to send the second ciphertext to the further participant to enable the further participant to perform random forest model training based on the second ciphertext; and
- receive feedback information sent by the further participant;
- the training module 902 being configured to train the node to be trained based on the feedback information and the second ciphertext to configure a category of the node to be trained or configuring a corresponding split feature value based on the feedback information and the second ciphertext; update, for the decision tree, the node to be trained for training, until a decision tree training finish condition is met, to obtain a target decision tree, trainings for all decision tree in the random forest model being completed to obtain a target random forest model.

In some possible designs, the training module 902 is specifically configured to: if the type of the node to be trained is a leaf node, calculate to obtain, based on the first ciphertext and a second identity indicating whether the sample is present, encrypted sample numbers of respective categories; if the type of the node to be trained is an internal node, split the sample based on the first ciphertext and a plurality of first random feature values to obtain a first sample split result; and obtain an initial split gain of a plurality of second random feature values based on a second sample split result sent by the further participant, the second sample split result being a ciphertext result obtained by splitting, by the further participant, the sample based on a third ciphertext received in advance, the plurality of second random feature values, and the category label of the sample and add a noise, the third ciphertext being obtained by performing semi-homomorphic encryption on the second identity.

In some possible designs, the training module 902 is specifically configured to: if the type of the node to be trained is a leaf node, configure the category of the node to be trained based on category identity information indicated by the feedback information.

In some possible designs, if the type of the node to be trained is an internal node, the feedback information comprises a fourth ciphertext, and the fourth ciphertext is obtained by the further participant calculating to obtain a ciphertext split gain of a first candidate split feature based on the first sample split result and performing differential privacy processing; and the training module 902 is specifically configured to configure a split feature value of the node to be trained by comparing a ciphertext split gain of a second candidate split feature indicated by the second ciphertext with the ciphertext split gain of the first candidate split feature.

In some possible designs, the transceiver module 901 is further configured to receive a ciphertext classification result sent by the further participant, the ciphertext classification result is obtained by performing, after an object to be classified is input into a random forest model corresponding to the further participant, semi-homomorphic encryption on a first identity of the object to be classified at the leaf node reached;

- the electric device further includes: a classification module 903, configured to input the object to be classified into the target random forest model to obtain a second identity of the object to be classified on a corresponding node; and fusing the ciphertext classification result and the second identity in the ciphertext space to obtain a fusion result;
- the transceiver module 901, further configured to send the fusion result to the further participant to enable the further participant to determine a category of the object to be classified based on the fusion result.

The apparatus provided in this embodiment may be configured to implement the steps performed by the second participant in the foregoing method embodiments, and implementation principles and technical effects thereof are similar, and reference may be made to the detailed description of the foregoing method embodiments. For the sake of brevity, it will not be repeated here.

As an example, the present disclosure provides an electronic device, comprising: one or more processors; a memory; and one or more computer programs; herein the one or more computer programs are stored in the memory; and when executing the one or more computer programs, the one or more processors cause the electronic device to implement the method for vertical federated learning performed by the first participant or the second participant in the foregoing embodiments.

As an example, the present disclosure provides a chip system applied to an electronic device including a memory and a sensor; where the chip system includes: a processor; and the processor executes the method for vertical federated learning performed by the first participant or the second participant in the foregoing embodiments.

As an example, the present disclosure provides a computer-readable storage medium having a computer program stored thereon, where the computer program, when executed by a processor, causes the electronic device to perform the method for vertical federated learning performed by the first participant or the second participant in the foregoing embodiments.

As an example, the present disclosure provides a computer program product, when the computer program product runs on a computer, the computer is caused to perform the method for vertical federated learning performed by the first participant or the second participant in the foregoing embodiments.

In the foregoing embodiment, all or part of functions may be implemented by software, hardware, or a combination of software and hardware. When implemented using software, all or part of the implementation may be in the form of a computer program product. The computer program product includes one or more computer instructions. When computer program instructions are loaded and executed on a computer, procedures or functions according to embodiments of the present disclosure are all or partially generated. The computer may be a general purpose computer, a special purpose computer, a computer network, or other programmable device. The computer instructions may be stored in a computer-readable storage medium. The computer-readable storage medium may be any available medium that can be accessed by a computer or a data storage device such as a server or a data center integrated with one or more available media. The available medium may be a magnetic medium (for example, a floppy disk, a hard disk, a magnetic tape), an optical medium (for example, a DVD), a semiconductor medium (for example, a solid state disk (SSD)), or the like.

It should be noted that, in this specification, relational terms such as "first" and "second" are merely used to distinguish one entity or operation from another entity or operation, and do not necessarily require or imply that any such actual relationship or sequence exists between these entities or operations. Moreover, the terms "comprising," "including," or any other variation thereof are intended to cover a non-exclusive inclusion, such that a process, method, article, or device comprising a series of elements includes not only those elements, but also other elements not expressly listed, or elements inherent to such a process, method, article, or device. Without further restriction, the elements defined by the statement "include one . . . " do not preclude the presence of additional identical elements in the process, method, article, or device that includes the elements.

The above descriptions are only specific embodiments of the present disclosure, so that those skilled in the art can understand or implement the present disclosure. Various modifications to these embodiments will be apparent to those skilled in the art, the general principles defined herein may be implemented in other embodiments without departing from the spirit or scope of the present disclosure. Accordingly, the present disclosure will not be limited to these embodiments described herein, but is to be accorded the widest scope consistent with the principles and novel features disclosed herein.

We claim:

1. A method for vertical federated learning, comprising:

upon training a random forest model based on a common sample participating in vertical federated learning, performing, for a to-be-trained node of a decision tree of a plurality of decision trees included in the random forest model, semi-homomorphic encryption on a first identity indicating whether the sample is present and a category label of the sample to obtain a first ciphertext;

sending the first ciphertext to a further participant in the vertical federated learning to enable the further participant to calculate, in a ciphertext space and based on the first ciphertext, a ciphertext calculation result matching with a type of the to-be-trained node;

receiving a second ciphertext sent by the further participant, and training the to-be-trained node based on the type of the to-be-trained node and the second ciphertext to configure a category of the to-be-trained node or configure a corresponding split feature value, the second ciphertext comprising a result obtained by performing differential privacy processing on the ciphertext calculation result by the further participant; and updating the to-be-trained node, until a training finish condition is met, to obtain a target decision tree, wherein trainings for each of the plurality of decision trees in the random forest model are completed to obtain a target random forest model.

2. The method of claim 1, wherein training the to-be-trained node based on the type of the to-be-trained node and the second ciphertext to configure the category of the to-be-trained node or configure the corresponding split feature value comprises:

in accordance with a determination that the type of the to-be-trained node is a leaf node, configuring the category of the to-be-trained node based on encrypted sample numbers of respective categories indicated by the second ciphertext; and in accordance with a determination that the type of the to-be-trained node is an internal node, calculating a ciphertext split gain of a first candidate split feature based on a first sample split result included in the second ciphertext, the first sample split result being a ciphertext result obtained by splitting the sample by the further participant based on a plurality of first random feature values and the first ciphertext; and configuring a split feature value of the to-be-trained node by comparing a ciphertext split gain of a second candidate split feature indicated by the second ciphertext with the ciphertext split gain of the first candidate split feature.

3. The method of claim 2, wherein configuring the category of the to-be-trained node based on the encrypted sample number of respective categories indicated by the second ciphertext comprises:

decrypting the second ciphertext based on a semi-homomorphic private key to obtain an encrypted sample number corresponding to respective categories, and configuring a category corresponding to a maximum encrypted sample number as the category of the to-be-trained node.

4. The method of claim 2, wherein calculating the ciphertext split gain of the first candidate split feature based on the first sample split result included in the second ciphertext comprises:

decrypting the first sample split result based on a semi-homomorphic private key to obtain a plurality of data items, the plurality of data items being configured to indicate encrypted sample numbers of a left node and a right node obtained by the further participant splitting the sample based on the plurality of first random feature values;

performing weighted calculation based on the plurality of data items to obtain respective initial split gains corresponding to the plurality of first random feature values; and performing differential privacy processing on respective initial split gains corresponding to the plurality of first random feature values to obtain respective ciphertext split gains, and determining a first candidate feature value from the plurality of first random feature values, and obtaining the ciphertext split gain of the first candidate feature value.

5. The method of claim 2, wherein the type of the to-be-trained node is an internal node, and before receiving the second ciphertext sent by the further participant, the method further comprises:

selecting a plurality of second random feature values, and splitting the sample based on the plurality of second random feature values, the category label of the sample, and a third ciphertext received in advance and adding a random noise to obtain a second sample split result; and sending the second sample split result to the further participant to enable the further participant to calculate the ciphertext split gain of the second candidate split feature based on the second sample split result.

6. The method of claim 2, further comprising:

in accordance with a determination that the type of the to-be-trained node is a leaf node, sending category identity information of the to-be-trained node to the further participant; and in accordance with a determination that the type of the to-be-trained node is an internal node, performing differential privacy processing on the ciphertext split gain of the first candidate split feature value to obtain a fourth ciphertext, and sending the fourth ciphertext to the further participant to enable the further participant to configure a corresponding to-be-trained node in a random forest model corresponding to the further participant based on the fourth ciphertext.

7. The method of claim 1, wherein before performing the semi-homomorphic encryption on the first identity indicating whether the sample is present and the category label of the sample to obtain the first ciphertext, the method further comprises:

obtaining a node depth of the to-be-trained node in the decision tree to which the to-be-trained node belongs;

in accordance with a determination that the node depth is equal to a predetermined maximum tree depth, determining the to-be-trained node as a leaf node of the decision tree to which the to-be-trained node belongs; in accordance with a determination that the node depth is less than the predetermined maximum tree depth, obtaining an encrypted sample total number of the to-be-trained node returned by the further participant; and in accordance with a determination that the encrypted sample total number is less than a predetermined minimum split sample number, determining the to-be-trained node as a leaf node of the decision tree to which the to-be-trained node belongs; in accordance with a determination that the encrypted sample total number is greater than or equal to the predetermined minimum split sample number, determining the to-be-trained node as an internal node of the decision tree to which the to-be-trained node belongs.

8. The method of claim 1, wherein performing the semi-homomorphic encryption on the first identity indicating whether the sample is present and the category label of the sample to obtain the first ciphertext comprises:

obtaining a category flag vector of the sample by a logical AND operation based on the first identity of the sample and the category label; and performing semi-homomorphic encryption on the category flag vector of the sample based on a semi-homomorphic public key to obtain the first ciphertext.

9. The method of claim 1, further comprising:

inputting an object to be classified into the target random forest model, upon the object to be classified reaching a leaf node, performing semi-homomorphic encryption on a first identity of the object to be classified at the leaf node to obtain a ciphertext classification result;

sending the ciphertext classification result to the further participant;

receiving a fusion result fed back by the further participant, the fusion result being obtained by fusing the ciphertext classification result and a second identity of the object to be classified at a corresponding node in the further participant; and in accordance with a determination that the fusion result meets a predetermined condition, determining a category of the object to be classified as a category of a leaf node currently reached; in accordance with a determination that the fusion result does not meet the predetermined condition, continuing to determine a next leaf node which the object to be classified reaches, until the category of the object to be classified is determined.

10. A method for vertical federated learning, comprising:

upon training a random forest model based on a common sample participating in vertical federated learning, receiving, for a to-be-trained node of a decision tree of a plurality of decision trees included in the random forest model, a first ciphertext sent by a further participant in the vertical federated learning, the first ciphertext being obtained by performing semi-homomorphic encryption on a first identity indicating whether the sample is present and a category label of the sample by the further participant;

calculating to obtain, in a ciphertext space and based on the first ciphertext, a ciphertext calculation result matching with a type of the to-be-trained node, and performing differential privacy processing based on the ciphertext calculation result to obtain a second ciphertext, and sending the second ciphertext to the further participant to enable the further participant to perform random forest model training based on the second ciphertext;

receiving feedback information sent by the further participant, and configuring a category of the to-be-trained node or configuring a corresponding split feature value based on the feedback information and the second ciphertext; and updating the to-be-trained node, until a training finish condition is met, to obtain a target decision tree, wherein trainings for each of the plurality of decision trees in the random forest model are completed to obtain a target random forest model.

11. The method of claim 10, wherein calculating to obtain, in the ciphertext space and based on the first ciphertext, the ciphertext calculation result matching with the type of the to-be-trained node comprises:

in accordance with a determination that the type of the node to be trained is a leaf node, calculating to obtain, based on the first ciphertext and a second identity indicating whether the sample is present, encrypted sample numbers of respective categories; and in accordance with a determination that the type of the to-be-trained node is an internal node, splitting the sample based on the first ciphertext and a plurality of first random feature values to obtain a first sample split result; and obtaining an initial split gain of a plurality of second random feature values based on a second sample split result sent by the further participant, the second sample split result being a ciphertext result obtained by splitting, by the further participant, the sample based on a third ciphertext received in advance, the plurality of second random feature values, and the category label of the sample and adding a noise, the third ciphertext being obtained by performing semi-homomorphic encryption on the second identity.

12. The method of claim 11, wherein configuring the category of the to-be-trained node or configuring the corresponding split feature value based on the feedback information and the second ciphertext comprises:

in accordance with a determination that the type of the to-be-trained node is a leaf node, configuring the category of the to-be-trained node based on category identity information indicated by the feedback information.

13. The method of claim 11, wherein in accordance with a determination that the type of the to-be-trained node is an internal node, the feedback information comprises a fourth ciphertext, and the fourth ciphertext is obtained by the further participant calculating to obtain a ciphertext split gain of a first candidate split feature based on the first sample split result and performing differential privacy processing; and configuring the category of the to-be-trained node or configuring the corresponding split feature value based on the feedback information and the second ciphertext comprises:

configuring a split feature value of the to-be-trained node by comparing a ciphertext split gain of a second candidate split feature indicated by the second ciphertext with the ciphertext split gain of the first candidate split feature.

14. The method of claim 10, further comprising:

receiving a ciphertext classification result sent by the further participant, the ciphertext classification result is obtained by performing, after an object to be classified is input into a random forest model corresponding to the further participant, semi-homomorphic encryption on a first identity of the object to be classified at the leaf node reached;

inputting the object to be classified into the target random forest model to obtain a second identity of the object to be classified on a corresponding node; and fusing the ciphertext classification result and the second identity in the ciphertext space to obtain a fusion result; and sending the fusion result to the further participant to enable the further participant to determine a category of the object to be classified based on the fusion result.

15. An electronic device, comprising: a memory and a processor;

the memory being configured to store computer program instructions;

the processor being configured to execute the computer program instructions to enable the electronic device to implement acts comprising:

upon training a random forest model based on a common sample participating in vertical federated learning, performing, for a to-be-trained node of a decision tree of a plurality of decision trees included in the random forest model, semi-homomorphic encryption on a first identity indicating whether the sample is present and a category label of the sample to obtain a first ciphertext, and sending the first ciphertext to a further participant in the vertical federated learning to enable the further participant to calculate to obtain, in a ciphertext space and based on the first ciphertext, a ciphertext calculation result matching with a type of the to-be-trained node;

receiving a second ciphertext sent by the further participant, and training the to-be-trained node based on the type of the to-be-trained node and the second ciphertext to configure a category of the to-be-trained node or configure a corresponding split feature value, the second ciphertext comprising a result obtained by performing differential privacy processing on the ciphertext calculation result by the further participant; and updating the to-be-trained node, until a training finish condition is met, to obtain a target decision tree, wherein trainings for each of the plurality of decision trees in the random forest model are completed to obtain a target random forest model.

16. The electronic device of claim 15, wherein training the to-be-trained node based on the type of the to-be-trained node and the second ciphertext to configure the category of the to-be-trained node or configure the corresponding split feature value comprises:

in accordance with a determination that the type of the to-be-trained node is a leaf node, configuring the category of the to-be-trained node based on encrypted sample numbers of respective categories indicated by the second ciphertext; and in accordance with a determination that the type of the to-be-trained node is an internal node, calculating a ciphertext split gain of a first candidate split feature based on a first sample split result included in the second ciphertext, the first sample split result being a ciphertext result obtained by splitting the sample by the further participant based on a plurality of first random feature values and the first ciphertext; and configuring a split feature value of the to-be-trained node by comparing a ciphertext split gain of a second candidate split feature indicated by the second ciphertext with the ciphertext split gain of the first candidate split feature.

17. The electronic device of claim 16, wherein configuring the category of the to-be-trained node based on the encrypted sample number of respective categories indicated by the second ciphertext comprises:

decrypting the second ciphertext based on a semi-homomorphic private key to obtain an encrypted sample number corresponding to respective categories, and configuring a category corresponding to a maximum encrypted sample number as the category of the to-be-trained node.

18. The electronic device of claim 16, wherein calculating the ciphertext split gain of the first candidate split feature based on the first sample split result included in the second ciphertext comprises:

decrypting the first sample split result based on a semi-homomorphic private key to obtain a plurality of data items, the plurality of data items being configured to indicate encrypted sample numbers of a left node and a right node obtained by the further participant splitting the sample based on the plurality of first random feature values;

performing weighted calculation based on the plurality of data items to obtain respective initial split gains corresponding to the plurality of first random feature values; and performing differential privacy processing on respective initial split gains corresponding to the plurality of first random feature values to obtain respective ciphertext split gains, and determining a first candidate feature value from the plurality of first random feature values, and obtaining the ciphertext split gain of the first candidate feature value.

19. The electronic device of claim 15, wherein before performing the semi-homomorphic encryption on the first identity indicating whether the sample is present and the category label of the sample to obtain the first ciphertext, the acts further comprise:

obtaining a node depth of the to-be-trained node in the decision tree to which the to-be-trained node belongs;

in accordance with a determination that the node depth is equal to a predetermined maximum tree depth, determining the to-be-trained node as a leaf node of the decision tree to which the to-be-trained node belongs; in accordance with a determination that the node depth is less than the predetermined maximum tree depth, obtaining an encrypted sample total number of the to-be-trained node returned by the further participant; and in accordance with a determination that the encrypted sample total number is less than a predetermined minimum split sample number, determining the to-be-trained node as a leaf node of the decision tree to which the to-be-trained node belongs; in accordance with a determination that the encrypted sample total number is greater than or equal to the predetermined minimum split sample number, determining the to-be-trained node as an internal node of the decision tree to which the to-be-trained node belongs.

20. The electronic device of claim 15, wherein performing the semi-homomorphic encryption on the first identity indicating whether the sample is present and the category label of the sample to obtain the first ciphertext comprises:

obtaining a category flag vector of the sample by a logical AND operation based on the first identity of the sample and the category label; and performing semi-homomorphic encryption on the category flag vector of the sample based on a semi-homomorphic public key to obtain the first ciphertext.

* * * * *